United States Patent
Bringuier et al.

(10) Patent No.: US 10,809,477 B2
(45) Date of Patent: Oct. 20, 2020

(54) JACKET FOR A FIBER OPTIC CABLE

(71) Applicant: Corning Optical Communications LLC, Hickory, NC (US)

(72) Inventors: Anne Germaine Bringuier, Taylorsville, NC (US); Brandon Robert Williamson, Hickory, NC (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 548 days.

(21) Appl. No.: 15/259,746

(22) Filed: Sep. 8, 2016

(65) Prior Publication Data
US 2016/0377825 A1 Dec. 29, 2016

Related U.S. Application Data

(63) Continuation of application No. PCT/US2015/020082, filed on Mar. 12, 2015.
(Continued)

(51) Int. Cl.
G02B 6/44 (2006.01)

(52) U.S. Cl.
CPC .......... *G02B 6/4433* (2013.01); *G02B 6/443* (2013.01); *G02B 6/4434* (2013.01); *G02B 6/4486* (2013.01); *G02B 6/441* (2013.01)

(58) Field of Classification Search
CPC ..... G02B 6/4433; G02B 6/4434; G02B 6/486
See application file for complete search history.

(56) References Cited

U.S. PATENT DOCUMENTS 3,879,518 A * 4/1975 Ney ............ B29C 47/027
174/113 R
4,340,771 A * 7/1982 Watts ............ H01B 11/1016
174/106 D
(Continued)

FOREIGN PATENT DOCUMENTS

CA 2720945 A1 9/2010
CN 102017019 A 4/2011
(Continued)

OTHER PUBLICATIONS

Bindu et al., Viscoelastic Behavior and Reinforcement Mechanism in Rubber Nanocomposites in the Vicinity of Spherical Nanoparticles, The Journal of Physical Chemistry B 2013 117 (41), 12632-12648.*
(Continued)

*Primary Examiner* — Peter Radkowski
(74) *Attorney, Agent, or Firm* — William D. Doyle

(57) ABSTRACT

A fiber optic cable includes a core and a jacket surrounding the core. The jacket includes a base layer, a surface layer defining an exterior surface of the fiber optic cable, and an interface between the surface and base layers. The base layer is formed from a first composition that includes polyethylene. The surface layer has a thickness of at least 300 micrometers and is formed from a second composition that differs from the first composition. The second composition includes polyethylene as well as one or more additives, including paracrystalline carbon. The interface cohesively bonds the surface and base layers to one another at least in part due to molecular chain entanglement of the polyethylene of the first and second compositions.

20 Claims, 1 Drawing Sheet

Related U.S. Application Data

(60) Provisional application No. 61/954,774, filed on Mar. 18, 2014.

(56) References Cited

U.S. PATENT DOCUMENTS

| | | | | |
|---|---|---|---|---|
| 4,976,519 | A * | 12/1990 | Davey | G02B 6/4438 385/102 |
| 4,978,536 | A * | 12/1990 | Takahashi | A61K 8/26 424/684 |
| 5,001,304 | A * | 3/1991 | Hardin | G02B 6/443 174/107 |
| 5,101,467 | A * | 3/1992 | Bernard | G02B 6/4429 385/112 |
| 5,567,914 | A * | 10/1996 | Minarovic | H02G 15/18 174/93 |
| 5,742,008 | A * | 4/1998 | Dalrymple | H01B 7/0869 174/103 |
| 5,882,776 | A * | 3/1999 | Bambara | B32B 5/18 156/79 |
| 6,183,814 | B1 * | 2/2001 | Nangeroni | C09D 167/04 427/361 |
| 6,210,802 | B1 * | 4/2001 | Risch | G02B 6/4401 428/372 |
| 6,221,928 | B1 * | 4/2001 | Kozma | C08F 255/00 521/134 |
| 6,317,542 | B1 * | 11/2001 | Hardwick, III | G02B 6/4411 385/109 |
| 6,459,836 | B1 * | 10/2002 | Bocanegra | G02B 6/4435 174/102 D |
| 6,605,652 | B1 * | 8/2003 | Stone | C09D 11/101 523/160 |
| 6,744,954 | B1 * | 6/2004 | Tanaka | G02B 6/4427 385/113 |
| 6,898,354 | B2 * | 5/2005 | Kim | G02B 6/4483 385/100 |
| 6,912,347 | B2 * | 6/2005 | Rossi | G02B 6/4438 385/112 |
| 7,885,501 | B2 * | 2/2011 | Patlakh | F41H 5/0457 385/100 |
| 8,031,997 | B2 * | 10/2011 | Overton | C03C 25/106 385/110 |
| 8,119,916 | B2 * | 2/2012 | Caccia | H01B 7/1875 174/110 R |
| 8,261,441 | B1 * | 9/2012 | Carlsten | H02G 1/16 29/825 |
| 8,541,059 | B2 * | 9/2013 | Aklian | C08G 18/4063 106/287.23 |
| 8,618,418 | B2 * | 12/2013 | Amato | H01B 7/1875 174/106 R |
| 8,620,124 | B1 * | 12/2013 | Blazer | G02B 6/4489 385/102 |
| 8,682,124 | B2 * | 3/2014 | Logan | G02B 6/4495 385/100 |
| 2003/0228116 | A1 * | 12/2003 | Davis | G02B 6/4438 385/109 |
| 2005/0045368 | A1 * | 3/2005 | Keogh | H01B 7/295 174/120 R |
| 2005/0281517 | A1 * | 12/2005 | Wessels, Jr. | G02B 6/4429 385/109 |
| 2008/0247717 | A1 * | 10/2008 | Patlakh | F41H 5/0457 385/113 |
| 2009/0068366 | A1 * | 3/2009 | Aklian | C08G 18/4063 427/385.5 |
| 2009/0068453 | A1 * | 3/2009 | Chung | B32B 27/08 428/337 |
| 2009/0317039 | A1 * | 12/2009 | Blazer | G02B 6/443 385/107 |
| 2010/0092139 | A1 * | 4/2010 | Overton | C03C 25/106 385/110 |
| 2010/0276179 | A1 * | 11/2010 | Amato | H01B 7/1875 174/113 R |
| 2011/0225814 | A1 * | 9/2011 | Amato | H01B 7/1875 29/828 |
| 2011/0286706 | A1 * | 11/2011 | Greenwood, III | G02B 6/4495 385/107 |
| 2011/0303487 | A1 * | 12/2011 | Caccia | H01B 7/1875 182/141 |
| 2013/0094821 | A1 * | 4/2013 | Logan | G02B 6/4495 385/100 |
| 2013/0108226 | A1 * | 5/2013 | Gimblet | G02B 6/4495 385/100 |

FOREIGN PATENT DOCUMENTS

| | | | |
|---|---|---|---|
| CN | 102017019 B | 3/2012 | |
| EP | 1085359 A2 | 3/2001 | |
| IN | 201002002 P3 | 4/2011 | |
| JP | 08218286 A * | 8/1996 | |
| JP | 2001348544 A * | 12/2001 | |
| MX | 2010011741 A | 11/2010 | |
| WO | WO 02074843 A2 * | 9/2002 | B32B 5/18 |
| WO | WO 02074843 A3 * | 12/2002 | B32B 5/18 |
| WO | 2010104538 A1 | 9/2010 | |
| WO | 2011149463 A | 12/2011 | |

OTHER PUBLICATIONS

Litvinov et al., Rubber—Filler Interactions and Network Structure in Relation to Stress—Strain Behavior of Vulcanized, Carbon Black Filled EPDM, Macromolecules 2011 44 (12), 4887-490.*

C.E. Clyburn III & C.L. Tedder, "Selection of a Robust Buffer Tube Material for Outdoor Optical Fiber Cable," 1997, Proceedings from the Society of Plastics Engineers 55th Annual Technical Conference, vol. 3, pp. 3266-3270.

Patent Cooperation Treaty, International Search Report and Written Opinion for PCT/US2015/020082, dated Jun. 5, 2015, 11 pages.

* cited by examiner

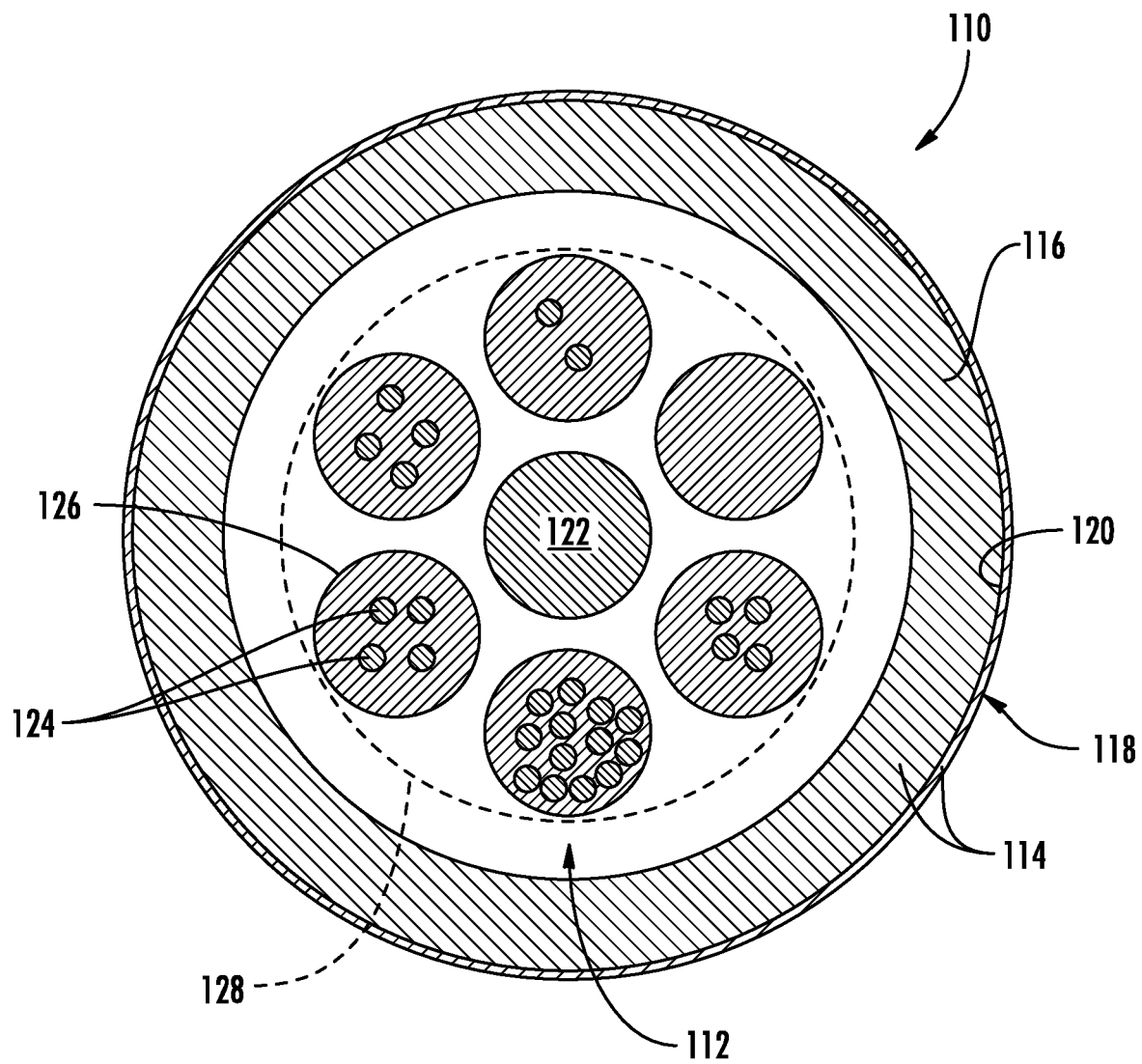

JACKET FOR A FIBER OPTIC CABLE

RELATED APPLICATIONS

This application is a continuation of International Application No. PCT/US2015/20082, filed on Mar. 12, 2015, which claims the benefit of priority under 35 U.S.C. § 119 of U.S. Provisional Patent Application No. 61/954,774, filed Mar. 18, 2014, the content of which is relied upon and incorporated herein by reference in their entirety.

BACKGROUND

Aspects of the present disclosure relate generally to fiber optic cables, and more specifically to jackets or sheathing of such cables.

Fiber optic cable jackets surround and protect core components of the cable and are typically formed from polymers, such as polyvinyl chloride for indoor jackets and polyethylene for outdoor jackets. Some fiber optic cables include a jacket that has a "skin layer" of polyamide, which provides termite resistance to the cable. However, bonding between the polyamide skin layer and the underlying material of the jacket may be difficult, particularly if the respective materials are polar/non-polar incompatible. With poor bonding, the polyamide skin layer may separate from the underlying material, such as when the cable bends or flexes, resulting in delamination and wrinkles in the jacket. A need exist for a fiber optic cable with a robust and cohesive jacket that has good flexibility and structural/dimensional stability with scratch resistance and generally low surface friction.

SUMMARY

The present technology relates a jacket for outdoor loose tube cables, but may also apply to ribbon-, indoor-, and other cables. The jacket may perform a variety of functions and include desired attributes such as strength and ruggedness during installation, such as resisting compression forces, impact, and bending stresses. The jacket may have durability and integrity over an outdoor lifetime (e.g., 20 years) while exposed to heat, humidity, ultra-violet light-irradiation and ground/conduit/aerial conditions. The jacket may exhibit minimal shrinkage and have a low thermal coefficient of expansion during temperature variations to minimize transfer of stresses to optical fibers. Further, the jacket may be co- or tandem-extruded, such as in one pass on a manufacturing line, or otherwise extruded with multiple layers that have excellent bond strength to one another at least in part due to presence of a same constituent in adjoining layers. Each layer may provide a specific feature, attribute, or characteristic of the cable and the layers may complement one another to enhance or augment those features, attributes, or characteristics of the other layers.

Some embodiments relate to a fiber optic cable that includes a core and a jacket surrounding the core. The jacket includes a base layer, a surface layer defining an exterior surface of the fiber optic cable, and an interface between the surface and base layers. The base layer is formed from a first composition that includes polyethylene. The surface layer has a thickness of at least 300 micrometers and is formed from a second composition that differs from the first composition. The second composition also includes polyethylene as well as one or more additives, including paracrystalline carbon. The interface between the surface and base layers cohesively bonds the surface and base layers to one another at least in part due to molecular chain entanglement of the polyethylene of the surface and base layers. In some such embodiments, the base layer serves as a backbone to the surface layer, providing dimensional stability and tensile strength, such as through the addition of filling material in the base layer that may not be present in the surface layer.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying FIGURE is included to provide a further understanding, and is incorporated in and constitutes a part of this specification. The drawing illustrates one or more embodiments, and together with the Detailed Description serves to explain principles and operations of the various embodiments. As such, the disclosure will become more fully understood from the following Detailed Description, taken in conjunction with the accompanying FIGURE, in which:

FIG. 1 is a cross-sectional view of a fiber optic cable according to an exemplary embodiment.

DETAILED DESCRIPTION

Referring to FIG. 1, a fiber optic cable, in the form of a loose tube cable 110, includes a core 112 and a jacket 114 surrounding the core 112. The jacket 114 includes a base layer 116, a surface layer 118 defining an exterior surface of the fiber optic cable 110, and an interface 120 between the surface and base layers 118, 116. According to an exemplary embodiment, the core 112 includes a strength element, such as a central strength member 122, tensile yarn (e.g., aramid, fiberglass), or stranded steel wires. The central strength member 122 may be in the form of a rod and may include glass-reinforced plastic, which is dielectric. The core 112 includes one or more optical fibers 124 (e.g., at least 2, at least 4, at least 12, at least 72 optical fibers 124), which may be loosely positioned in one or more tubular elements, such as buffer tubes 126 or micromodule sheathing, which may be stranded around the central strength member 122, or otherwise positioned in the core 112.

In some embodiments, the core 112 may include a binding element (see generally element 128), such as binder yarns (e.g., counter-helically wrapped polyester yarns) or a binder film, as discussed in U.S. Pat. No. 8,620,124. In some embodiments, the core 112 may include a water-blocking element (see generally element 128), such as water-blocking tape, water-blocking yarns, filling compound, and/or superabsorbent polymer. In some embodiments, the core 112 may include a sorting element (see generally buffer tube 128), such as colored thread wrapped round bundles of optical fibers. In some embodiments, the core 112 may include a flame-retardant element (see generally element 128), such as heat resistive tape (e.g., mica tape) or heat dissipative tape (e.g., aluminum foil).

According to an exemplary embodiment, the buffer tubes 126 may be primarily formed from a polymer or polymers, such as polypropylene, polycarbonate, and/or polybutylene terephthalate. In some embodiments, the polymer may be a filled polymer, such as including inorganic filler. In some embodiments, the buffer tubes 126 are generally elongate cylinders or cylindrical tubes having an outer diameter of about 2.5 millimeters or less, such as about 2 millimeters or less. In contemplated embodiments, the buffer tubes 126 may even be narrower, such as having an outer diameter of about 1.6 millimeters±0.2 millimeters. Further, the buffer tubes 126 may have a wall thickness of 0.5 millimeters or less, such as 0.4 millimeters or less. In other embodiments, the buffer tubes 126 may be otherwise shaped and/or otherwise sized.

According to an exemplary embodiment, the base layer 116 of the jacket 114 is formed from a first composition, which may include polyethylene. The surface layer 118 is formed from a second composition that differs from the first composition. In some such embodiments, the second composition also includes polyethylene as well as one or more additives. The interface between the surface and base layers 118, 116 cohesively bonds the surface and base layers 118, 116 to one another at least in part due to molecular chain entanglement of the polyethylene of the first and second compositions. According to an exemplary embodiment, the cohesive bond between the base and surface layers 116, 118 at the interface 120 is at least half as great as the internal tear strength of either the first or second composition, such as at least 75% as great, or even as great, in some embodiments, such that attempts to pull the surface layer 118 apart from the base layer 116 may tear the respective layer(s). Applicants believe that the molecular entanglements of the polyethylene branches may occur during co-extrusion of the respective layers. Accordingly, co-extrusion may provide better bonding than other extrusion techniques, such as sequential runs through a single extruder or use of tandem extruders, however such other extrusion techniques are contemplated for alternative process embodiments, such as those embodiments including additional steps such as plasma- or flame-treating the exterior of the base layer 16 prior to extrusion of the surface layer 118 to improve adhesion therebetween.

In some embodiments, the polyethylene of the second composition of the surface layer 118 has a higher density than the polyethylene of the first composition of the base layer 116. In some such embodiments, the density of the polyethylene of the second composition is in the range of about 0.93 to 0.97 g/cm$^3$ and the density of the polyethylene of the first composition is in the range of about 0.91 to 0.94 g/cm$^3$. In other contemplated embodiments, the same type of polyethylene is used for the first and second compositions, and the compositions differ from one another due to differences in other constituents, such as the presence of carbon black in the second composition but not the first composition, or other differences as disclosed herein.

According to an exemplary embodiment, paracrystalline carbon may be added to the second composition of the surface layer 118, which may serve to block ultra-violet light from penetrating the surface layer 118. In some such embodiments, the paracrystalline carbon includes (e.g., primarily consists of, is) carbon black. The carbon black may have a particle size of at least 20 and/or no greater than 350 nanometers and a tensile strength of at least 9 MPa and/or no greater than 26 MPa. The concentration of carbon black in the second composition, in some such embodiments, may be at least 2% by volume, such as at least 2.2%, 2.5%±0.2% or at least 2.4%, while the base layer has a lesser concentration of carbon black, such as less than 2%, less than 1%, less than 0.2%, or possibly even essentially zero carbon black. According to an exemplary embodiment, the surface layer 118 has a thickness of at least 300 micrometers and the carbon black is well dispersed.

In some embodiments, the base layer 116 serves as a backbone to the surface layer 118, providing dimensional stability and tensile strength to the jacket 114, such as through the addition of filling material in the base layer 116 that may not be present in the surface layer 118. For example, the surface layer 118 may be formed from a material, such as primarily including high-density polyethylene, which may have generally high shrinkage. However, the base layer 116 may be primarily formed from a filled medium- or low-density polyethylene, which may hold the surface layer 118 in place, opposing the shrinkage and maintaining the desired shape of the respective jacket 114. The base layer 116 may include (e.g., primarily consist of, consist of at least 50% by weight) recycled polyethylene, natural polyethylene, virgin polyethylene, and/or may have lower carbon black concentration than the surface layer 118, such as essentially no carbon black.

In some such embodiments, the first composition of the base layer is heavily filled, having filler be at least 20% by volume thereof, such as at least 30%, or even at least 35%. The filler of the first composition may be an inorganic mineral filler, such as talc or clay. In some embodiments, the filler is a silica or silicon powder, which may be at least 1% water-absorbent by volume, such as between about 2 to 3% water-absorbent. In some embodiments, the filler is a flame-retardant filler, such as aluminum trihydrate, magnesium hydroxide, or another filler. The second composition may have substantially less of the filler, such as less than 10% by volume thereof, or even essentially zero. The filler of the first composition may improve the strength of the base layer 116. In some such embodiments, inorganic mineral filler provides tensile strength to the base layer 116 such that the first composition is at least 10% greater in ultimate tensile strength than the first composition minus the inorganic mineral filler. In contemplated embodiments, other fillers may be used.

The surface layer 118 may be co-extruded or otherwise extruded onto a base layer 116, which may have a substantially lower concentration of carbon black (e.g., a fifth, a tenth, a hundredth the percentage) and/or a lower coefficient of thermal expansion (e.g., at least 10%, 20%, 25% lower) than the surface layer 118. The magnitude of coefficient of thermal expansion (CTE) reduction due to filler addition may be significant. For example, in at least one embodiment, the addition of 30% glass fiber filler may reduce the CTE of high-density polyethylene from about 200 to 20 $10^{-6}$/° C., or by a factor of 10. Talc/glass fiber filler combination, in at least another embodiment, may reduce the CTE to approximately 30% of the original value.

The surface and base layers 118, 116 may exhibit excellent adhesion at their interface and act as one jacket 114 while each layer 118, 116 provides complementary properties to the other. The surface layer 118 may contain commercially-available additives to achieve lower friction, increased wettability, improved weathering performance, and/or for termite or rodent resistance; where some or all of these additives are not present the in the base layer 116. Further, the base layer 116 may use a lower-cost polyethylene such as recycled polyethylene or natural polyethylene, and/or may bring added performance to the cable 110 such as via low coefficient of thermal expansion obtained with a different grade of polyethylene, such as one with a bimodal molecular weight distribution or a polyethylene filled with mineral fillers such as talc, clay, mica, or other reinforcing agents.

Jackets 114 of the present disclosure synergistically receive favorable characteristics of different types of polyethylene. For example, linear low density polyethylene, as may be used in the first composition of the base layer 116, has excellent flexibility, better than some types of medium-density polyethylene, less shrinkage than some types of medium-density polyethylene or high-density polyethylene because it has less crystallinity and may have a lesser propensity for stress cracking. However linear low density polyethylene may have a higher coefficient of friction and a lower modulus compared to high-density polyethylene. Medium-density polyethylene is generally more expensive than low-density polyethylene and high-density polyethylene, especially in a fully carbon black compounded version. The higher density of high-density polyethylene, as may be used with the surface layer 118, may result in mechanical properties that may be superior to some other types of polyethylene. For example, high-density polyethylene may be stronger and have lower friction, which may be useful for moving the respective cable 110 through a duct or other narrow space, but the higher crystallinity of high-density polyethylene may lead to higher shrinkage. For example, the base layer 116 may define an interior surface (e.g., cavity) of the fiber optic cable 110, and the exterior surface of the jacket 114 defined by the surface layer 118 has at least 0.1 less static coefficient of friction than the interior surface, such as at least 0.2 less. Further, the interior surface may have greater surface roughness than the exterior surface. The base layer 116 may be stiff to add crush resistance to the cable 110, such as being heavily filled, as discussed above, so as to act as a buttressing layer or backbone against crush and impact forces, while a more flexible surface layer 118 may provide crack resistance. The synergistic effects are enhanced because the surface layer 118 is fully bonded to the base layer 116 in some embodiments.

In some embodiments, the base layer 116 offsets shrinkage and/or shrink-back of the surface layer 118 and limits shrinkage and/or shrink-back of the overall cable 110, which may be evidenced through temperature cycle testing. For example, according to prophetic analysis, the cable 110 may be cooled from room temperature of about 23° C. to –40° C. at a rate of up to 1.5 degrees C. per minute, held at –40° C. for 24 hours, then cycled to +70° C. at the same rate, held at +70° C. for 24 hours, and then cycled back to –40° C. at the same rate (see generally ICEA 640 Section 7.24.1, which is incorporated by reference herein). When the cable 110 is at –40° C. the second time compared to the first time, the average change in attenuation of the optical fibers 124 of the cable is less than 0.1 dB per km of cable at 1310 nanometers wavelength and/or at 1550 nanometers wavelength, such as less than 0.08 dB/km at 1310 and/or 1550 nanometers wavelengths, or even less than 0.07 0.08 dB/km at 1310 and/or 1550 nanometers wavelengths.

According to alternative contemplated embodiments, one or both of the surface and base layers 118, 116 of the jacket 114 may be or include a natural polyethylene grade mixed with a carbon black masterbatch. In some contemplated embodiments, one or both of the surface and base layers 118, 116 may be or include a cross-linked polyethylene. Organic fillers, flame-retardant fillers, or additives such as charring agents may be compounded into the surface layer 118 and/or the base layer 116, such as to increase the flame retardant properties of the jacket 114 and/or to provide a charring cover that may protect a more flammable core 112. Organic fillers that may be included in either the first or second composition include fibers of flame retardant polymers. Inorganic flame-retardant fillers, such as aluminum hydroxide or magnesium hydroxide, may be attached to the polyethylene matrix or other constituents with organosiloxanes.

Ultra-violet light protection to the fiber optic cable 110 afforded by carbon black in the surface layer 118 may be directly related to dispersion of the carbon black. Applicants believe a high degree of dispersion with little agglomeration helps the carbon black to work effectively. Two common ways to characterize dispersion of carbon black in the surface layer are the visual test of British Standard 2782: Methods 828A and B and the ultra-violet light absorption technique of ASTM D 3349, both test standards incorporated by reference herein. With the visual test, in some embodiments, carbon black of the surface layer 118 at least has an average rating of 3 with no streaking observed. The ultra-violet light absorption technique quantitatively defines the absorption efficiency of the carbon black in a sample. Like the visual test, a thin film of the material from the jacket 114 is pressed or a sample is microtomed. Then, the absorption coefficient at 375 nanometer wavelength is calculated. ASTM D3349 provides the respective equation. Some embodiments of the surface layer 118 have an absorption coefficient of at least 150, such as at least 300 or greater.

Technology disclosed herein provides a jacket 114 for a fiber optic cable 110 with a composite structure than can be made in one pass. The composite structure allows synergistic combination of the characteristics of each layer, while use of the same base polymer provides highly bonded layers. The jackets 114 disclosed herein may exhibit long term mechanical performance and durability in outdoor environments generally achieved with carbon black content in the surface layer 118 and good cable compression resistance and low shrinkage achieved with the base layer 116.

Although shown as loose tube cable 110, other types of cables may benefit from the technology disclosed herein. For example, ribbon cable, drop cable, indoor cable, and other types of cables may include jackets having synergistic structural configurations as disclosed herein. Further, optical fibers 124 disclosed herein may be single mode, multimode, multicore, ribbons, plastic, or other types or configurations of optical fibers. The optical fibers 124 may include a glass core and cladding surrounded by polymeric coating(s), resulting in an outer diameter of about 250 micrometers±25 micrometers, about 200 micrometers±25 micrometers, or otherwise sized. In some embodiments, the core 112 of the cable 110 includes additional components, such as one or more ripcords, water-blocking components, additional strength members, etc. The cable 110 may include armor (see generally element 128), such as corrugated metal armor (e.g., steel, or aluminum or copper for electro-magnetic shielding). Cables using the technology disclosed herein may include conductive components.

The construction and arrangements of the cable and jackets, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic cable, comprising:
a core comprising:
at least one optical fiber; and
one or more of the following: a strength element, a tubular element, a binding element, a water-blocking element, a flame-retardant element, armor, and another optical fiber;
a jacket surrounding the core, the jacket comprising:
a base layer formed from a first composition, wherein the first composition comprises polyethylene; and
a surface layer defining an exterior surface of the fiber optic cable, wherein the surface layer has a thickness of at least about 300 micrometers, wherein the surface layer is formed from a second composition that differs from the first composition, wherein the second composition comprises polyethylene, wherein the second composition comprises one or more additives comprising paracrystalline carbon, and wherein the paracrystalline carbon is concentrated in the surface layer such that the second composition has a percentage by volume of the paracrystalline carbon that is at least ten times greater than the percentage by volume thereof in the first composition; and
an interface between the surface and base layers, the interface cohesively bonding the surface and base layers to one another at least in part due to molecular chain entanglement of the polyethylene of the first and second compositions.

2. The cable of claim 1, wherein the polyethylene of the second composition has a higher density than the polyethylene of the first composition.

3. The cable of claim 2, wherein the density of the polyethylene of the second composition is in the range of about 0.93 to 0.97 g/cm$^3$ and the density of the polyethylene of the first composition is in the range of about 0.91 to 0.94 g/cm$^3$.

4. The cable of claim 1, wherein the cohesive bond between the base and surface layers at the interface is at least half as great as the internal tear strength of either the first or second composition.

5. The cable of claim 1, wherein the paracrystalline carbon comprises carbon black having a particle size of between 20 and 350 nanometers and a tensile strength of between 9 and 26 MPa, whereby the paracrystalline carbon provides ultra-violet light protection for the fiber optic cable.

6. The cable of claim 5, wherein the concentration of the carbon black is at least 2% by volume in the surface layer, and the base layer has a concentration of carbon black that is less than 0.2%.

7. The cable of claim 1, wherein the first composition is heavily filled, having at least 20% by volume thereof inorganic mineral filler, thereby enhancing the base layer.

8. The cable of claim 7, wherein the inorganic mineral filler comprises at least one of talc and clay, and wherein the second composition of the surface layer has less than 10% by volume thereof talc or clay.

9. The cable of claim 7, wherein the inorganic mineral filler provides tensile strength to the base layer such that the first composition is at least 10% greater in ultimate tensile strength than the first composition minus the inorganic mineral filler.

10. The cable of claim 1, wherein the surface layer is thinner than the base layer.

11. The cable of claim 1, wherein the polyethylene of the base layer is uncolored or natural polyethylene colored.

12. The cable of claim 11, wherein the polyethylene of the surface layer is colored with colorant.

13. The cable of claim 1, wherein the base layer defines an interior surface of the fiber optic cable, and wherein the exterior surface has at least 0.1 less static coefficient of friction than the interior surface.

14. The cable of claim 13, wherein the interior surface has greater surface roughness than the exterior surface.

15. The cable of claim 1, wherein the additives of the second composition of the surface layer further comprise a secondary stabilizer for extended lifetime, which is not present in the first composition of the base layer of the jacket.

16. The cable of claim 1, wherein the additives of the second composition of the surface layer further comprise a lubricant for blowing/cable jetting installation, which is not present in the first composition of the base layer of the jacket.

17. The cable of claim 1, wherein the additives of the second composition of the surface layer further comprise fiberglass for termite or rodent resistance, which is not present in the first composition of the base layer of the jacket.

18. The cable of claim 1, wherein the additives of the second composition of the surface layer further comprise a wetting agent to increase printability, which is not present in the first composition of the base layer of the jacket.

19. The cable of claim 1, wherein the core comprises the strength element, wherein the strength element comprises a central strength member, wherein the central strength member is dielectric, wherein the central strength member is a rod, wherein the rod comprises glass-reinforced plastic; the core of the fiber optic cable further comprising buffer tubes wound around the central strength member in a pattern of reverse-oscillatory stranding; wherein the at least one optical fiber comprises a plurality of optical fibers, and wherein the plurality of optical fibers extend through the buffer tubes.

20. The cable of claim 19, wherein the core further comprises a layer of armor between the buffer tubes and the jacket.

* * * * *